July 19, 1966     W. E. MASON     3,261,616

INDUSTRIAL APPARATUS

Filed Feb. 11, 1964     2 Sheets-Sheet 1

INVENTOR
WALTER E. MASON
by Hyde W. Ballard
Atty.

July 19, 1966
W. E. MASON
3,261,616
INDUSTRIAL APPARATUS
Filed Feb. 11, 1964
2 Sheets-Sheet 2
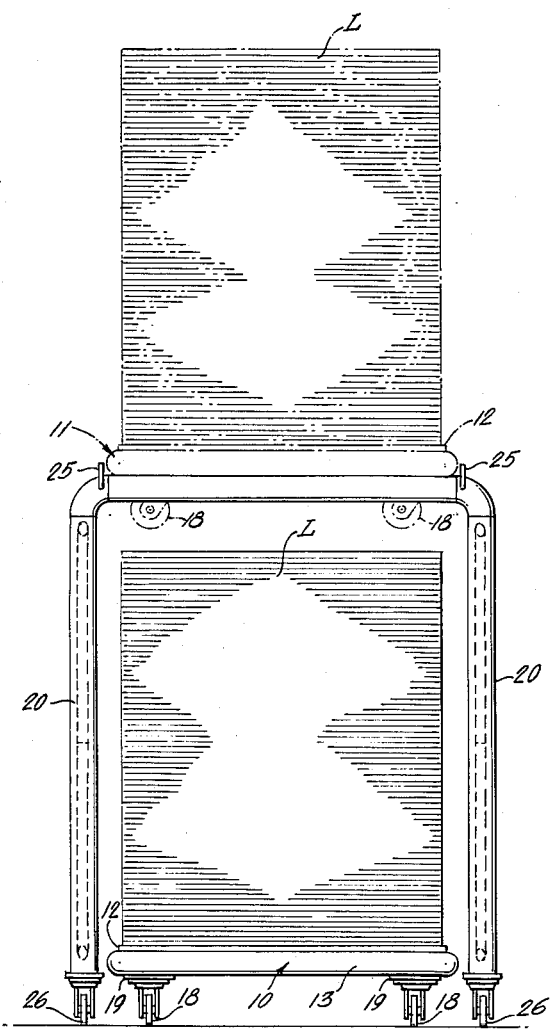
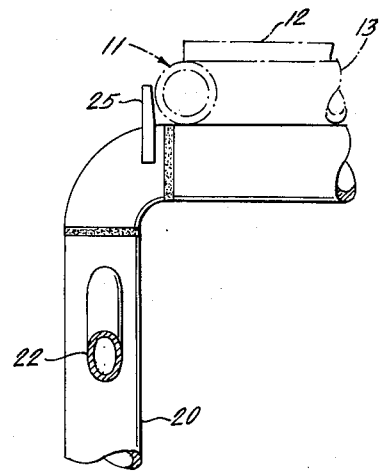
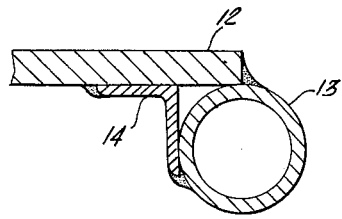
INVENTOR:
WALTER E. MASON
by Hyde W. Ballard
Atty.

United States Patent Office 3,261,616
Patented July 19, 1966

3,261,616
INDUSTRIAL APPARATUS
Walter E. Mason, Clayton, Ga., assignor to James Lees and Sons Company, Bridgeport, Pa., a corporation of Delaware
Filed Feb. 11, 1964, Ser. No. 344,017
1 Claim. (Cl. 280—33.99)

This invention relates to materials handling apparatus and more particularly to an improved stacked dolly assembly useful in the storage of bulky objects such as rugs and the like.

In the storing and handling of relatively heavy items which must be frequently moved and relocated from time to time, I have found that it is possible to effect substantial saving in space and handling time with the use of the combination of a plurality of dollies, one of which is stacked over the other by means of an elevated framework mounted on casters. The apparatus of the invention requires a minimum of storage space and permits ready access to either dolly by means of a conventional fork lift truck.

A primary object of the invention, therefore, is to provide a dolly assembly which includes a pair of identical dollies and a framework having open sides within which one of the dollies with its material to be stored is positioned and on top of which the second dolly with its material to be stored is supported.

A further object of the invention is to provide an open-ended framework, a dolly straddled by said framework and a second dolly mounted between limit stops on the top of the framework in vertical alignment with the first dolly.

Figure 1:
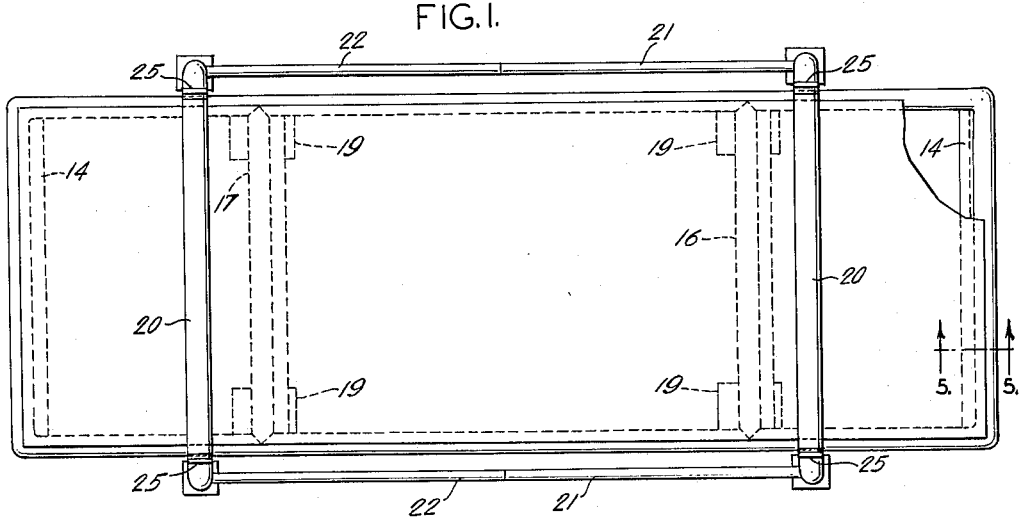
Figure 2:
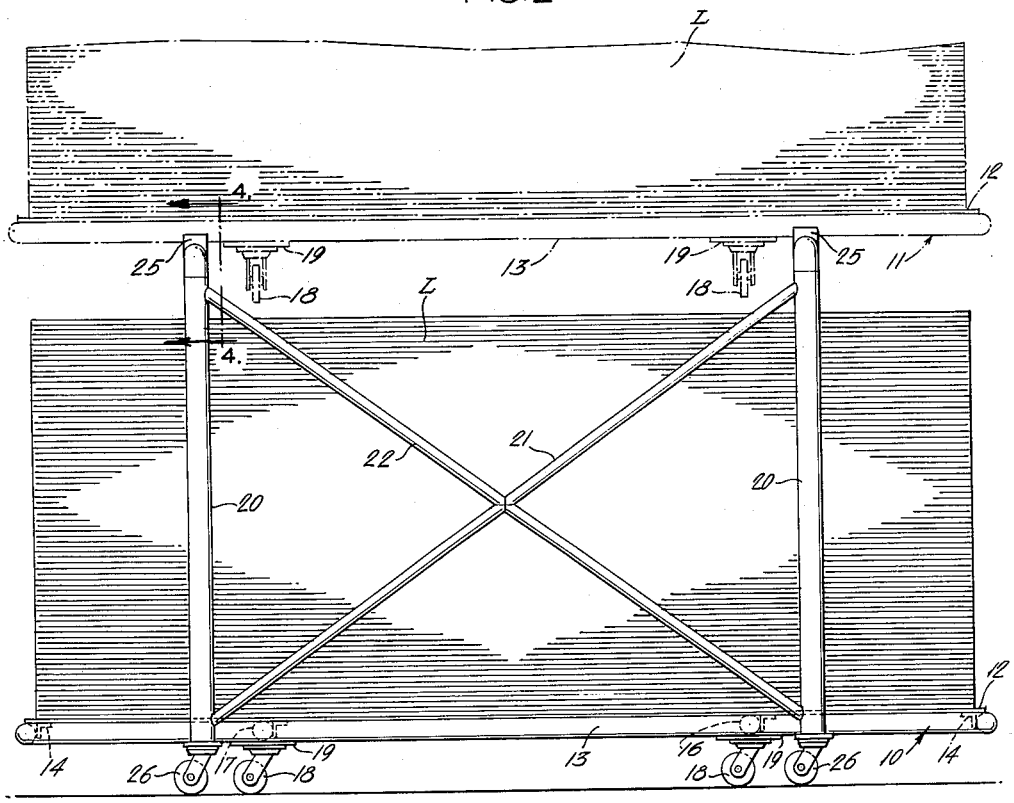

Further objects will be apparent from the specification and drawings in which:

FIGURE 1 is a top view of my improved stacked dolly assembly with the stored material removed and only the lower dolly in position, FIGURE 2 is a side view of the structure of FIGURE 1 showing a series of rugs or other material stored in place upon each dolly, FIGURE 3 is an end view of the structure of FIGURE 1, FIGURE 4 is an enlarged sectional detail as seen at 4—4 of FIGURE 2, and FIGURE 5 is an enlarged sectional detail as seen at 5—5 of FIGURE 1.

Referring now more particularly to the drawings, my improved storage assembly comprises a pair of dollies 10 and 11 which are desirably formed of a flat plate or platform 12 secured by welding or other suitable means to a tubular frame 13. The construction of each dolly is shown in FIGURE 5 in which the plate 12 is welded to the tubular frame 13 and reinforced by means of angles 14 welded to both the frame 13 and the plate 12. Cross members 16 and 17 are secured underneath the plate 12 approximately one-quarter of the length of the dolly. These cross members serve as reinforcing elements for the plate as well as for mounting a plurality (preferably four) of casters 18, 18 attached to plates 19, 19 welded under the frame 13 at each terminus of the cross members 16 and 17.

It will be understood that the construction of each of the dollies 10 and 11 is identical and therefore it is believed unnecessary to repeat the above details with respect to the second dolly. The same reference numerals are used on each.

The second dolly 11 is supported upon an elevated framework or truss comprising a pair of inverted U-shaped tubular standards 20, 20 tied together on each side by means of cross braces 21 and 22. The construction on each side of the framework is the same as that shown in FIGURE 2. The upper horizontal portion of each of the U-shaped members 20, 20 is provided with a pair of abutments 25, 25 (FIGURE 4) which are laterally spaced a distance slightly in excess of the maximum width of the tubular portion of the dollies 10 and 11. Suitable casters 26, 26 are provided at the bottom of each of the members 20, 20. The width of the members 20 which comprise the framework or truss is sufficient to permit the dollies 10 to be rolled under the framework with a suitable load L of material to be stored which may be in the form of a plurality of rugs, a bin, or any other container or article which is intended to be stored on the dolly 10. The second dolly 11 is elevated by means of a fork lift truck or other suitable device and stacked on the horizontal portions of the framework between stops 25, 25 and generally in vertical alignment with the lower dolly 10.

The particular combination of interchangeable dollies, one of which is mounted on a movable framework, is found to provide very substantial benefits over other previously known types of stacking devices. In the first place the contents of either dolly are completely accessible without in any way moving or disturbing the other. If it is desired to remove the top dolly 11, this may be accomplished by simply lifting it off the side of the supporting framework by means of a fork lift truck. Since, however, the dollies are not always stored in such a manner that complete access from the side is practical, the upper dolly can be pulled endwise to any location where it is accessible from the side with a fork lift truck. This is accomplished without in any way moving the lower dolly. Conversely, if access to the lower dolly is desired, this may be pulled out endwise with a fork lift truck or other convenient means so that complete access is possible to the contents of the lower dolly. It will thus be observed that not only is there a great saving in space but, unlike all other types of stacking containers, access to either the top or the bottom portion is permissible without disturbing the other. In the case of storage for articles such as rugs, this has been found to be a far superior apparatus than the conventional pallets or other storing devices. A most substantial saving in access time is effected.

Having thus described my invention, I claim:

A fork lift stackable dolly assembly which comprises in combination a first dolly having a generally rectangular platform, a plurality of casters secured to the underside of said platform in spaced relation to the corners of the platform thereby providing a substantial overhang of the platform beyond the casters, a framework dimensioned to straddle the first platform and having completely unobstructed ends whereby the first platform when loaded can be moved from underneath the framework, a plurality of casters on which the framework is mounted, side braces for the framework and connected thereto in spaced relation from the top of the framework to provide ready access for the fork of a forklift truck, and a second dolly supported on the top of the framework, said second dolly having a generally rectangular platform, a plurality of casters secured to the underside of said platform in spaced relation to the corners of the platform thereby providing a substantial overhang of the platform beyond the casters, the length of the framework being substantially shorter than the length of both the first and second dollies and the framework having an open area on the top to permit either dolly to rest on the framework at points spaced from the casters thereon.

References Cited by the Examiner

UNITED STATES PATENTS

| | | | |
|---|---|---|---|
| 1,750,131 | 3/1930 | Romine | 280—1 |
| 1,966,751 | 7/1934 | Brefeld | 211—71 |
| 2,110,158 | 3/1938 | Keeler | 211—182 |
| 2,862,720 | 12/1958 | Stone et al. | 280—33.99 |

BENJAMIN HERSH, *Primary Examiner.*

MILTON L. SMITH, *Examiner.*